United States Patent [19]

Tominaga et al.

[11] Patent Number: 5,252,370
[45] Date of Patent: Oct. 12, 1993

[54] OPTICAL RECORDING MEDIUM AND METHOD FOR MAKING

[75] Inventors: Junji Tominaga; Hideki Dohi, both of Nagano, Japan

[73] Assignee: TDK Corporation, Tokyo, Japan

[21] Appl. No.: 835,685

[22] Filed: Feb. 14, 1992

[30] Foreign Application Priority Data

Apr. 23, 1991 [JP] Japan .................. 3-119474

[51] Int. Cl.$^5$ .................................................. B32B 3/00
[52] U.S. Cl. ................................ 428/64; 428/65; 428/457; 428/913; 346/76 L; 346/135.1; 430/945
[58] Field of Search ............... 428/64, 65, 457, 688, 428/689, 702, 913; 430/945; 346/76 L, 135.1

[56] References Cited

U.S. PATENT DOCUMENTS 5,080,947 1/1992 Yamada et al. ................ 428/64

OTHER PUBLICATIONS

Nikkei Electronics; Jan. 23, 1989 (No. 465); p. 107.
The Functional Dye Department of the Kinki Chemical Society; Mar. 3, 1989; p. 1520.
SPIE, vol. 1078, Optical Recording Topical Meeting (1989); pp. 80-87.

*Primary Examiner*—Patrick J. Ryan
*Assistant Examiner*—Elizabeth Evans
*Attorney, Agent, or Firm*—Watson, Cole, Grindle & Watson

[57] ABSTRACT

A recording thin film, a dielectric thin film, and a reflective thin film are stacked on a surface of a substrate in the described order. Upon exposure to recording laser light, an inorganic compound in the recording thin film decomposes to release a gas, creating a space in the recording thin film. Since the substrate is also heated and softened, a recess is created in the substrate surface due to the pressure of evolving gas. The space and recess cause a change of optical conditions, resulting in a substantial lowering of reflectivity where the laser light is irradiated. This enables reproduction in accordance with the CD standard. The use of an inorganic compound which decomposes to release a gas upon heating rather than organic dyes ensures better light resistance, leading to highly reliable information storage. Recording sensitivity is high.

11 Claims, 1 Drawing Sheet

OPTICAL RECORDING MEDIUM AND METHOD FOR MAKING

FIELD OF THE INVENTION

This invention relates to an optical recording medium and a method for preparing the same, and more particularly, to an optical recording medium capable of reproduction in accordance with the compact disk standard and a method for preparing the same.

BACKGROUND OF THE INVENTION

Optical recording media, typically optical recording disks are of great interest as large capacity information recording media. Such optical recording media include those of the rewritable type such as phase change optical recording media and magneto-optical recording media and those of the write-once type such as pit formation type optical recording media.

Recently, there were proposed optical recording disks which can be once written or recorded in accordance with the compact disk (abbreviated as CD, hereinafter) standard. (See Nikkei Electronics, Jan. 23, 1989, No. 465, page 107; the Functional Dye Department of the Kinki Chemical Society, Mar. 3, 1989, Osaka Science & Technology Center; and SPIE, Vol. 1078, Optical Data Storage Topical Meeting, 80, 1989.) This type of disk has a dye layer, a reflective Au layer, and a protective layer stacked on a transparent resin substrate in this order. That is, the reflective layer is disposed in close contact with the dye layer.

These optical recording disks, however, are less resistant against weathering, especially light because organic dyes used therein are degraded by ultraviolet radiation in sunlight. The disks are thus difficult to keep reliable for an extended period of time both before and after recording.

DISCLOSURE OF THE INVENTION

The present invention has been developed under such circumstances and its object is to provide an optical recording medium capable of reproduction in accordance with the CD standard and having high light resistance as well as a method for preparing the same.

This and other objects are achieved by the present invention as defined below from (1) to (19).

(1) An optical recording medium comprising a recording thin film, a dielectric thin film, and a reflective thin film stacked on a surface of a substrate in the described order, said recording thin film containing an inorganic compound which decomposes to release a gas upon heating.

(2) The optical recording medium of (1) wherein said inorganic compound releases a gas at a temperature of up to 300° C.

(3) The optical recording medium of (1) or (2) wherein said gas is oxygen or nitrogen.

(4) The optical recording medium of any one of (1) to (3) wherein said inorganic compound is silver oxide or iron nitride.

(5) The optical recording medium of any one of (1) to (4) wherein said dielectric thin film contains silicon oxide.

(6) The optical recording medium of any one of (1) to (5) wherein said recording thin film is 600 to 1,500 Å thick and said dielectric thin film is 500 to 4,000 Å thick.

(7) The optical recording medium of any one of (1) to (6) which further comprises a low-melting thin film between said substrate and said recording thin film.

(8) The optical recording medium of (7) wherein said low-melting thin film is 10 to 200 Å thick.

(9) The optical recording medium of (7) or (8) wherein said low-melting thin film is comprised of a member selected from the group consisting of Sn, Zn, Pb, Bi, Tl, Te, Se, S, Al, Ga, Ge, Cd and I.

(10) The optical recording medium of any one of (1) to (9) wherein said reflective thin film is 300 to 1500 Å thick.

(11) The optical recording medium of any one of (1) to (10) wherein said reflective thin film is comprised of a member selected from the group consisting of Ag, Al, Au, Pt and Cu.

(12) The optical recording medium of any one of (1) to (11) wherein a recess is formed in the substrate surface where recording light is irradiated.

(13) The optical recording medium of any one of (1) to (12) wherein unrecorded and recorded portions have a reflectivity of at least 70% and up to 50%, respectively, at a wavelength of 300 to 900 nm.

(14) A method for preparing an optical recording medium as set forth in any one of (1) to (13), comprising the step of forming said recording thin film by a reactive sputtering technique.

(15) The method for preparing an optical recording medium of (14) wherein said recording thin film is formed by reactive sputtering in an oxygen gas containing atmosphere using Ag as a target.

(16) The method for preparing an optical recording medium of (15) wherein in the reactive sputtering, the flow rate of oxygen gas is 10 to 70% of the total flow rate of all gases.

(17) The method for preparing an optical recording medium of (14) wherein said recording thin film is formed by reactive sputtering in a nitrogen gas containing atmosphere using Fe as a target.

(18) The method for preparing an optical recording medium of (17) wherein in the reactive sputtering, the flow rate of nitrogen gas is 10 to 20% of the total flow rate of all gases.

(19) The method for preparing an optical recording medium of any one of (15) to (18) wherein the pressure during the reactive sputtering is from $3 \times 10^{-1}$ to 1.0 Pa.

OPERATION AND ADVANTAGES OF THE INVENTION

Referring to FIG. 1, the optical recording medium 1 of the present invention is shown as comprising a recording thin film 3, a dielectric thin film 4, and a reflective thin film 5 stacked on a surface of a substrate 2 and further comprising a protective film 6 on the reflective thin film 5.

Recording is done by directing recording laser light to recording thin film 3 from the back surface of substrate 2 through substrate 2 for heating recording thin film 3. Since the recording thin film contains an inorganic compound which decomposes to release a gas upon heating, exposure to recording laser light causes recording thin film 3 to release a gas. Where recording thin film 3 contains silver oxide, for example, the silver oxide decomposes into Ag and $O_2$ at about 160° C. Where recording thin film 3 contains iron nitride, for example, the iron nitride releases nitrogen at about 200° C. Then, the evolving gas creates a space 31 in recording thin film 3 as shown in FIGS. 1 and 2. Since resinous substrate 2 in proximity to recording thin film 3 is also heated and softened, a recess 21 is created at the interface between substrate 2 and recording thin film 3 by the pressure of the evolving gas.

The space and recess thus created cause a change in optical parameters of portions where recording laser light is irradiated such as optical constants and light path length, resulting in a lowering of reflectivity. The recess is roughened at the bottom, which also causes a lowering of reflectivity.

Since the change of light reflectivity thus induced is irreversible, the optical recording medium is available as the write-once type. The reflectivity of light in proximity to 780 nm used in the CD operation is 70% or higher before exposure to laser light, but decreases to about 50% or lower after exposure to laser light, especially to about 20% or lower when a selected inorganic compound is used in the recording thin film, which ensures the use as optical recording disks of the write-once type meeting the CD standard.

Further, since such a reflectivity change is available in the wavelength range of about 300 to 900 nm by adjusting the thickness of the dielectric thin film or the like, short wavelength recording is possible which leads to a higher recording density.

In an embodiment wherein the optical recording medium 1 of the invention further includes a low-melting thin film 7 between substrate 2 and recording thin film 3 as shown in FIG. 2, recording sensitivity is improved since low-melting thin film 7 is endothermic. This ensures that short signals like 3T signals are effectively recorded with low power laser light.

It is to be noted that Japanese Patent Publication No. 56920/1988 discloses "an optical recording material characterized by comprising an $Ag_2O-SiO_2$ type compound." This optical recording material utilizes the nature of an $Ag_2O-SiO_2$ type compound that blackens upon exposure to light and fades upon heating. It is different from the concept for the optical recording medium according to the present invention of stacking a recording thin film containing silver oxide and a dielectric thin film containing silicon oxide. Its behavior is also quite different from that of the present invention. The publication describes an initial reflectivity of less than 40% and a lowering of reflectivity after light exposure of only 8%, which suggests the incapability for the optical recording medium to meet the CD standard.

BEST MODE FOR CARRYING OUT THE INVENTION

Now, the illustrative construction of the present invention is described in more detail.

Figure 1:
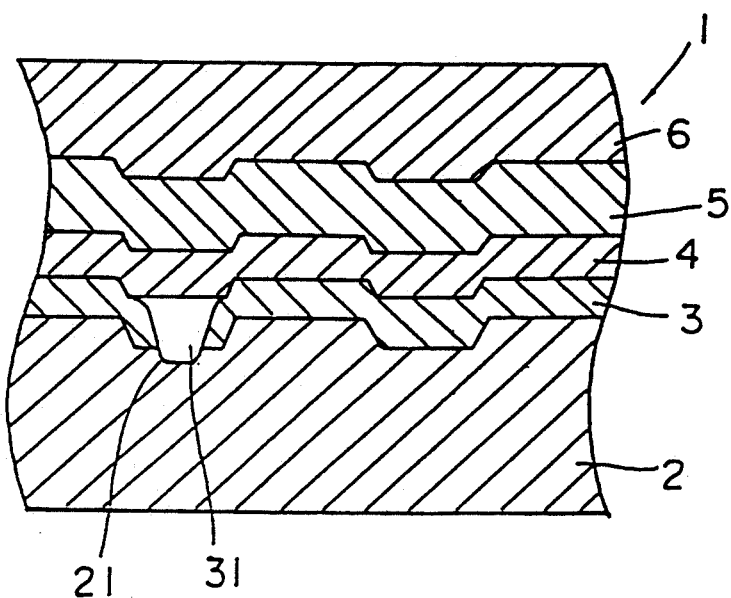
FIG. 1 is a fragmentary cross-sectional view of an optical recording medium according to one preferred embodiment of the present invention.

FIG. 1 shows an optical recording medium according to one preferred embodiment of the present invention.

The optical recording medium 1 is shown as comprising a recording thin film 3, a dielectric thin film 4, and a reflective thin film 5 stacked on a surface of a substrate 2 and further comprising a protective film 6 on reflective thin film 5.

Substrate 2

Since optical recording medium 1 is designed such that recording light and reproducing light are directed to recording thin film 3 through substrate 2, substrate 2 should be substantially transparent to the light. Also, since substrate 2 should be recessed by the pressure of gas evolving from recording thin film 3, substrate 2 is preferably formed of a resin. Various resins including acrylic resins, polycarbonate resins, epoxy resins, and polyolefin resins may be used.

The substrate 2 is not particularly limited in shape and dimensions although it is generally of disk shape, typically having a thickness of about 0.5 to 3 mm and a diameter of about 50 to 360 mm.

If necessary, substrate 2 on the surface may be provided with a predetermined pattern of grooves or the like for tracking and addressing purposes. In the illustrated embodiment, for example, the optical recording medium is provided with grooves within which recording light is directed.

Recording thin film 3

The recording thin film 3 contains an inorganic compound which decomposes to release a gas upon heating. Preferably the inorganic compound releases a gas at a temperature of up to 300° C. The type of gas released is not particularly limited although oxygen and nitrogen gases are preferred because these gases are stable in proximity of room temperature and non-toxic.

The inorganic compound that releases oxygen or nitrogen gas is preferably selected from silver oxide and iron nitride. Where silver oxide is used, recording thin film 3 should preferably contain 5 to 50 atom %, especially 10 to 30 atom % of oxygen. Where iron nitride is used, recording thin film 3 should preferably contain 5 to 50 atom %, especially 10 to 30 atom % of nitrogen. Preferably, recording thin film consists of silver oxide or iron nitride although any additional element such as Sn and Zn may be contained in a total content of up to about 10 atom %.

Preferably, the recording thin film has a thickness of 600 to 1,500 Å, especially 700 to 1,200 Å. Recording would become difficult with a thickness below the range whereas with a thickness beyond the range, reflectivity would become insufficient due to light absorption through the recording thin film.

The recording thin film 3 is preferably formed by gas phase growth techniques such as sputtering and evaporation techniques, especially by a reactive sputtering technique using oxygen or nitrogen gas as a reactive gas.

A recording thin film of silver oxide is formed by reactive sputtering in an atmosphere containing oxygen gas using Ag as a target. Preferably, oxygen gas is used in admixture with an inert gas such as Ar and the flow rate of oxygen gas is 10 to 70% of the total flow rate of all gases. If the oxygen gas flow rate is outside this range, the oxygen content of the recording thin film would deviate from the optimum range, failing to provide sufficient recording sensitivity.

A recording thin film of iron nitride is formed by reactive sputtering in an atmosphere containing nitrogen gas using Fe as a target. Preferably, nitrogen gas is used in admixture with an inert gas such as Ar and the flow rate of nitrogen gas is 10 to 20% of the total flow rate of all gases. If the nitrogen gas flow rate is outside this range, the nitrogen content of the recording thin film would deviate from the optimum range, failing to provide sufficient recording sensitivity.

The pressure during reactive sputtering for depositing silver oxide or iron nitride preferably ranges from $3\times10^{-1}$ to 1.0 Pa, more preferably from $5\times10^{-1}$ to $9\times10^{-1}$ Pa, most preferably from $5\times10^{-1}$ to $8\times10^{-1}$ Pa.

It is to be noted that an RF sputtering technique is preferred for reactive sputtering although a DC sputtering technique is acceptable.

Dielectric thin film 4

The dielectric thin film 4 may be formed of various dielectric materials. The dielectric material used is not particularly limited. In the embodiment wherein recording thin film 3 contains silver oxide, dielectric thin film 4 is formed of silicon oxide because recording sensitivity is improved. The silicon oxide used herein preferably has a composition represented by $SiO_2$. In the embodiment wherein recording thin film 3 contains iron nitride, dielectric thin film 4 is formed of silicon nitride represented by $Si_3N_4$ because recording sensitivity is improved.

Additionally, the dielectric materials used herein include various ceramics and glasses which are transparent, for example, materials containing La, Si, O and N known as LaSiON, materials containing Si, Al, O and N known as SiAlON, and SiAlON materials further containing Y.

The thickness of dielectric thin film 4 may be properly selected in accordance with the index of refraction of a particular dielectric material used. Where the dielectric material used is $SiO_2$, for example, its thickness is preferably from 500 to 4,000 Å, more preferably from 1,800 to 3,500 Å, most preferably from 2,500 to 3,300 Å. Where a dielectric material having an index of refraction different from that of $SiO_2$ is used, its preferred thickness is determined by dividing the index of refraction of $SiO_2$ by the index of refraction of the dielectric material and multiplying the preferred thickness range for $SiO_2$ by the divided value. If the thickness of dielectric thin film 4 is outside the preferred range, it would become difficult to provide a satisfactory reflectivity and a substantial change thereof.

Preferably, dielectric thin film 4 is formed by gas phase growth techniques such as sputtering and evaporation techniques.

Reflective thin film 5

The reflective thin film 5 is preferably formed of high reflectivity metals and alloys, which may be properly selected from Ag, Al, Au, Pt, Cu and the like.

The reflective thin film 5 is preferably 300 to 1,500 Å thick. A thickness below the range is unlikely to provide sufficient reflectivity. A thickness beyond the range achieves only a slight improvement in reflectivity at the sacrifice of cost.

Preferably, reflective thin film 5 is formed by gas phase growth techniques such as sputtering and evaporation techniques.

Protective film 6

The protective film 6 is provided for the purposes of improving scratch resistance and corrosion resistance and preferably formed of various organic materials, especially radiation curable compounds or their compositions which are cured with radiation such as electron radiation and ultraviolet light.

The protective film 6 is usually about 0.1 to 100 μm thick. It may be formed by conventional techniques such as spin coating, gravure coating, spray coating, and dipping techniques.

Low-melting thin film 7

Figure 2:
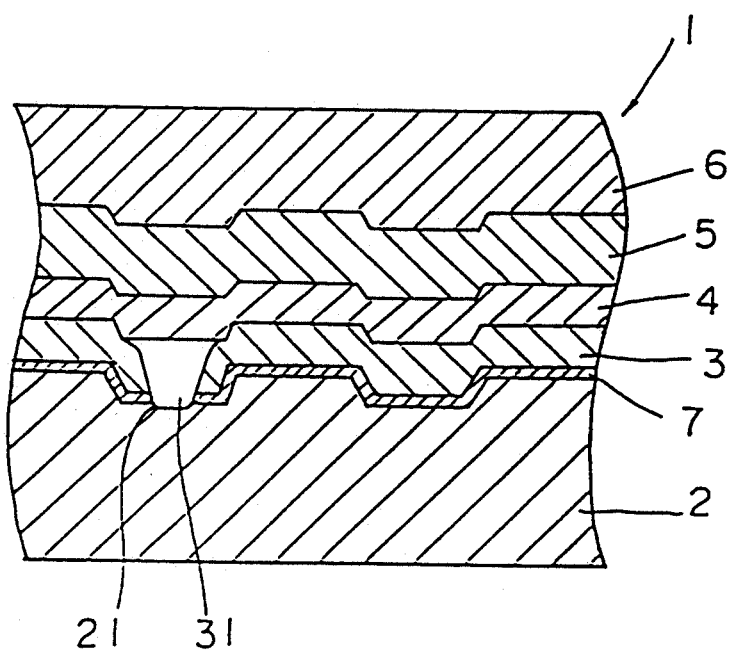
FIG. 2 is a fragmentary cross-sectional view of an optical recording medium according to another preferred embodiment of the present invention.

FIG. 2 shows an optical recording medium according to another preferred embodiment of the present invention.

The optical recording medium 1 is shown in FIG. 2 as including a low-melting thin film 7 between substrate 2 and recording thin film 3.

The low-melting thin film 7 is provided for the purpose of improving recording sensitivity and preferably formed of materials having a melting point of about 200° to 800° C. These materials include, for example, Sn, Zn, Pb, Bi, Tl, Te, Se, S, Al, Ga, Ge, Cd, I, etc. and alloys and compounds thereof and a proper choice may be made among these materials.

It is also possible to form low-melting thin film 7 from a low-melting resins. These resins include, for example, nitrocellulose, polyimides, and fluorocarbons. When resins are used, the low-melting thin film is preferably formed by evaporation although spin coating is acceptable.

The low-melting thin film 7 is preferably 10 to 200 Å, especially 50 to 100 Å thick. Recording sensitivity improvement would become insufficient with a thickness below this range whereas a thickness beyond this range would fail to provide sufficient reflectivity due to increased light absorption.

Preferably, low-melting thin film 7 is formed by gas phase growth techniques such as sputtering and evaporation techniques.

It is to be noted that when the recording thin film 3 is formed on the low-melting thin film 7, the low-melting thin film 7 can diffuse into the recording thin film 3.

Change of reflectivity

When recording laser light is directed to the optical recording medium 1 constructed as shown in FIG. 1 from the back surface of substrate 2, the recording laser light transmitted by substrate 2 heats recording thin film 3. The inorganic compound in recording thin film 3 is heated and thus decomposed to generate a gas. For example, where the inorganic compound is silver oxide, it is decomposed into Ag and $O_2$, evolving $O_2$ gas. Where the inorganic compound is iron nitride, it is decomposed into Fe and $N_2$, evolving $N_2$ gas. The pressure of the evolving gas causes a space 31 to be created within recording thin film 3.

In unison with a temperature rise in recording thin film 3, the temperature of substrate 2 in proximity to recording thin film 3 is also increased so that substrate 2 becomes softened. This allows the pressure of the evolving gas to dig a recess 21 in the substrate 2 surface. As the case may be, dielectric thin film 4 can also be depressed by the gas pressure.

In the embodiment of FIG. 2 having low-melting thin film 7, low-melting thin film 7 is heated and melted due to exposure to recording laser light, helping heat recording thin film 3 and substrate 2.

Within space 31 created as a result of recording laser light irradiation, optical constants including index of refraction n (the real part of a complex index of refraction) and a coefficient of extinction k (the imaginary part of a complex index of refraction) become changed from those in recording thin film 3, and the light path length is changed due to the formation of recess 21, resulting in changes of multiple reflection conditions. A substantial lowering of reflectivity thus occurs where recording laser light is irradiated.

The recess 21 is about 500 to 1,500 Å, especially about 500 to 800 Å deep. Such dimensions are determinable by means of a scanning electron microscope (SEM) and scanning tunnel microscope (STM). The recess 21 is roughened at its bottom. It is believed that roughening is caused by bubbles of gas evolving as a result of decomposition of the inorganic compound. This roughening also contributes to a lowering of reflectivity.

Medium structure

Although the embodiments wherein the present invention is applied to optical recording media of the one side recording type corresponding to the CD standard have been described, the present invention is also applicable to optical recording media of the double side recording type.

The present invention is applied to optical recording media of the double side recording type by mating a pair of substrates 2 such that recording thin film 3 is sealed inside.

Also contemplated herein is a medium of the one side recording type having a protective plate adhesively bonded to the protective film 6. The protective plate used herein may be of the same material as substrate 2 although other materials may be used because the protective plate need not be transparent.

EXAMPLE

Examples of the present invention are given below by way of illustration.

Example 1

An optical recording disk, sample No. 1, of the construction shown in FIG. 1 was fabricated by forming a recording thin film 3 of silver oxide, a dielectric thin film 4 of silicon oxide, a reflective thin film 5 and a protective film 6 of UV curable resin on a surface of a substrate 2.

The substrate 2 used was a disk having a diameter of 133 mm and a thickness of 1.2 mm injection molded from polycarbonate resin with grooves configured at the same time.

The recording thin film 3 was formed to a thickness of 800 Å by reactive RF sputtering in an atmosphere containing oxygen gas and Ar gas. The sputtering pressure was $5.5 \times 10^{-1}$ Pa and the flow rates of oxygen and Ar gases were both 10 SCCM. The target used was Ag and the sputtering power was 200 W. The composition of recording thin film 3 was analyzed by Auger spectroscopy to find that it consisted of 10 atom % of oxygen and the balance of Ag.

The dielectric thin film 4 was formed to a thickness of 2,700 Å by sputtering using $SiO_2$ as a target.

The reflective thin film 5 was formed to a thickness of 1,000 Å by sputtering using Ag as a target.

The protective film 6 was formed by applying a UV curable resin by a spin coating technique and exposing the resin to UV for curing. It was 5 μm thick at the end of curing.

For sample No. 1, CD signals (3T, 5T, 7T, 9T and 11T) were recorded and reproduced. Laser light of 8 mW was directed for recording and laser light of 0.5 mW directed for reproduction. The laser light had a wavelength of 780 nm.

The results that unrecorded portions had a reflectivity of 70% and recorded portions had a reflectivity of 20% indicated the ability to reproduce in accordance with the CD standard.

A piece cut from sample No. 1 was treated with acid to dissolve and remove the reflective, dielectric and recording thin films on the substrate surface, and the exposed surface of the substrate was observed under SEM to find formation of recesses of 500 to 1,000 Å deep at the recording site. The recesses were roughened at the bottom probably due to evolution of gas bubbles.

Example 2

An optical recording disk, sample No. 2, was fabricated in the same manner as sample No. 1 of Example 1 except that the recording thin film 3 had a thickness of 900 Å and the dielectric thin film 4 had a thickness of 3,200 Å.

Sample No. 2 was subjected to the same recording/reproducing test as in Example 1 to find that unrecorded portions had a reflectivity of 78% and recorded portions had a reflectivity of 8%, indicating a higher modulation than sample No. 1.

Sample No. 2 also had recesses formed in the substrate surface at the recording site as in sample No. 1. The recesses were 500 to 800 Å deep.

Example 3

An optical recording disk, sample No. 3, of the construction shown in FIG. 2 was fabricated by disposing a low-melting thin film 7 between the substrate 2 and the recording thin film 3.

The low-melting thin film 7 was formed to a thickness of 50 Å by sputtering using Sn as a target.

The components other than low-melting thin film 7 were the same as in sample No. 1 fabricated in Example 1.

Sample No. 3 was recorded and reproduced using recording laser light having a power of 6 mW lower by 2 mW than that used for sample No. 1 and reproducing laser light having a power of 0.5 mW. Like sample No. 1, sample No. 3 was able to reproduce in accordance with the CD standard.

Sample No. 3 also had recesses formed in the substrate surface at the recording site as in sample No. 1.

Example 4

An optical recording disk, sample No. 4, was fabricated in the same manner as sample No. 1 of Example 1 except that the recording thin film 3 was formed of iron nitride and the dielectric thin film 4 was formed of silicon nitride.

The recording thin film 3 was formed to a thickness of 800 Å by reactive RF sputtering in an atmosphere containing nitrogen gas and Ar gas. The sputtering pressure was $5.5 \times 10^{-1}$ Pa, the flow rate of nitrogen gas was 1 SCCM and the flow rate of Ar gas was 10 SCCM. The target used was Fe and the sputtering power was 200 W. The composition of recording thin film 3 was analyzed by Auger spectroscopy to find that it consisted of 10 atom % of nitrogen and the balance of Fe.

The dielectric thin film 4 was formed to a thickness of 2,300 Å by sputtering using $Si_3N_4$ as a target.

For sample No. 4, CD signals (3T, 5T, 7T, 9T and 11T) were recorded and reproduced. Laser light of 10 mW was directed for recording and laser light of 0.5 mW directed for reproduction. The laser light had a wavelength of 780 nm.

The results that unrecorded portions had a reflectivity of 70% and recorded portions had a reflectivity of 20% indicated the ability to reproduce in accordance with the CD standard.

Sample No. 4 also had recesses formed in the substrate surface at the recording site as in sample No. 1.

Example 5

An optical recording disk, sample No. 5, of the construction shown in FIG. 2 was fabricated by disposing a low-melting thin film 7 between the substrate 2 and the recording thin film 3.

The low-melting thin film 7 was formed in the same manner as sample No. 3 of Example 3 while the remaining components were the same as sample No. 4 of Example 4.

Sample No. 5 was recorded and reproduced using recording laser light having a power of 6 mW lower by 4 mW than that used for sample No. 4 and reproducing laser light having a power of 0.5 mW. Like sample No. 4, sample No. 5 was able to reproduce in accordance with the CD standard.

Sample No. 5 also had recesses formed in the substrate surface at the recording site as in sample No. 1.

Example 6

Optical recording disk samples were fabricated in the same manner as in the foregoing Examples except that the reflective thin film 3 was formed of Al, Au, Pt or Cu.

These samples were subjected to the same recording/reproducing test as in the foregoing Examples, finding substantially equivalent results.

We claim:

1. An optical recording medium comprising a recording thin film, a dielectric film, and a reflective thin film stacked on a surface of a substrate in the described order, said recording thin film containing silver oxide or iron nitride which decomposes to release oxygen or nitrogen, respectively, upon heating.

2. The optical recording medium of claim 1 wherein said inorganic compound releases a gas at a temperature of up to 300° C.

3. The optical recording medium of any one of claims 1 to 2 wherein said dielectric thin film contains silicon oxide.

4. The optical recording medium of any one of claims 1 to 3 wherein said recording thin film is 600 to 1,500 Å thick and said dielectric thin film is 500 to 4,000 Å thick.

5. The optical recording medium of any one of claims 1 to 4 which further comprises a low-melting thin film between said substrate and said recording thin film.

6. The optical recording medium of claim 5 wherein said low-melting thin film is 10 to 200 Å thick.

7. The optical recording medium of claim 5 or 6 wherein said low-melting thin film is comprised of a member selected from the group consisting of Sn, Zn, Pb, Bi, Tl, Te, Se, S, Al, Ga, Ge, Cd and I.

8. The optical recording medium of any one of claims 1 to 7 wherein said reflective thin film is 300 to 1500 Å thick.

9. The optical recording medium of any one of claims 1 to 8 wherein said reflective thin film is comprised of a member selected from the group consisting of Ag, Al, Au, Pt and Cu.

10. The optical recording medium of any one of claims 1 to 9 wherein a recess is formed in the substrate surface where recording light is irradiated.

11. The optical recording medium of any one of claims 1 to 10 wherein unrecorded and recorded portions have a reflectivity of at least 70% and up to 50%, respectively, at a wavelength of 300 to 900 nm.

* * * * *